(12) United States Patent
De Mondt

(10) Patent No.: US 10,730,332 B2
(45) Date of Patent: Aug. 4, 2020

(54) MANUFACTURING OF DECORATIVE PANELS BY INKJET

(71) Applicants: AGFA NV, Mortsel (BE); Unilin BvbA, Wielsbeke (BE)

(72) Inventor: Roel De Mondt, Mortsel (BE)

(73) Assignees: AGFA NV, Mortsel (BE); UNILIN BVBA, Wielsbeke (BE)

( * ) Notice: Subject to any disclaimer, the term of this patent is extended or adjusted under 35 U.S.C. 154(b) by 15 days.

(21) Appl. No.: 15/575,982

(22) PCT Filed: May 11, 2016

(86) PCT No.: PCT/EP2016/060511
§ 371 (c)(1),
(2) Date: Nov. 21, 2017

(87) PCT Pub. No.: WO2016/188745
PCT Pub. Date: Dec. 1, 2016

(65) Prior Publication Data
US 2018/0170083 A1    Jun. 21, 2018

(30) Foreign Application Priority Data

May 22, 2015    (EP) .................................. 15168913

(51) Int. Cl.
*B41M 5/00* (2006.01)
*B41M 7/00* (2006.01)
(Continued)

(52) U.S. Cl.
CPC ........... *B41M 5/0047* (2013.01); *B32B 5/022* (2013.01); *B32B 7/04* (2013.01); *B32B 27/08* (2013.01);
(Continued)

(58) Field of Classification Search
CPC .............. B41M 5/0047; B41M 7/0081; B41M 7/0027; B41M 5/0064; B32B 27/12;
(Continued)

(56) References Cited

U.S. PATENT DOCUMENTS 6,099,109 A * 8/2000 Komuro ............... B41J 2/14024
347/50
2006/0062955 A1* 3/2006 Liu .......................... B32B 7/12
428/40.1
(Continued)

FOREIGN PATENT DOCUMENTS

EP    1 609 828 A1    12/2005
EP    2 865 527 A1    4/2015
(Continued)

OTHER PUBLICATIONS

Official Communication issued in International Patent Application No. PCT/EP2016/060511, dated Aug. 2, 2016.

*Primary Examiner* — Yaovi M Ameh
(74) *Attorney, Agent, or Firm* — Keating and Bennett, LLP

(57) ABSTRACT

A method for manufacturing polymeric decorative panels includes, in order, the steps of a) inkjet printing an image on a first thermoplastic foil using an aqueous pigmented inkjet ink; b) applying a second thermoplastic foil on the inkjet printed image; c) heat pressing the first and second thermoplastic foils into a decorative laminate; and d) cutting the laminate into a decorative panel; wherein the aqueous pigmented inkjet ink contains polymeric resin particles and a self-dispersing colour pigment; and at least one of the first and second thermoplastic foils is a transparent foil.

15 Claims, 2 Drawing Sheets

(51) Int. Cl.
  *B44C 5/04* (2006.01)
  *B32B 5/02* (2006.01)
  *B32B 27/12* (2006.01)
  *B32B 7/04* (2019.01)
  *B32B 27/08* (2006.01)
  *B32B 27/30* (2006.01)
  *C09D 11/322* (2014.01)
  *E04F 15/02* (2006.01)
  *E04F 15/10* (2006.01)

(52) U.S. Cl.
  CPC ............ *B32B 27/12* (2013.01); *B32B 27/304* (2013.01); *B41M 5/0064* (2013.01); *B41M 7/0027* (2013.01); *B41M 7/0081* (2013.01); *B44C 5/04* (2013.01); *C09D 11/322* (2013.01); *E04F 15/02038* (2013.01); *B32B 2255/10* (2013.01); *B32B 2255/26* (2013.01); *B32B 2255/28* (2013.01); *B32B 2262/101* (2013.01); *B32B 2264/0214* (2013.01); *B32B 2264/0292* (2013.01); *B32B 2264/102* (2013.01); *B32B 2307/21* (2013.01); *B32B 2307/4023* (2013.01); *B32B 2307/41* (2013.01); *B32B 2307/412* (2013.01); *B32B 2307/554* (2013.01); *B32B 2307/58* (2013.01); *B32B 2307/732* (2013.01); *B32B 2307/75* (2013.01); *B32B 2451/00* (2013.01); *B32B 2607/00* (2013.01); *E04F 15/102* (2013.01)

(58) Field of Classification Search
  CPC ......... B32B 7/04; B32B 27/304; B32B 27/08; B32B 5/022; B32B 2264/0214; B32B 2255/26; B32B 2451/00; B32B 2307/732; B32B 2307/41; B32B 2264/0292; B32B 2307/554; B32B 2262/101; B32B 2307/21; B32B 2255/28; B32B 2607/00; B32B 2307/58; B32B 2307/75; B32B 2264/102; B32B 2307/4023; B32B 2255/10; B32B 2307/412; C09D 11/322; B44C 5/04; E04F 15/102; E04F 15/02038
  See application file for complete search history.

(56) References Cited

U.S. PATENT DOCUMENTS

| | | | |
|---|---|---|---|
| 2013/0257034 A1* | 10/2013 | Shimohara | C09D 11/30 283/62 |
| 2014/0267520 A1* | 9/2014 | Toda | B41J 11/002 347/102 |
| 2015/0239230 A1* | 8/2015 | Vermeulen | B44C 5/0476 101/27 |
| 2015/0343739 A1* | 12/2015 | Pervan | B32B 5/30 52/582.1 |

FOREIGN PATENT DOCUMENTS

| | | |
|---|---|---|
| EP | 2 865 531 A1 | 4/2015 |
| WO | 2011/077311 A2 | 6/2011 |
| WO | 2014/084787 A1 | 6/2014 |
| WO | 2014/147374 A1 | 9/2014 |

\* cited by examiner

MANUFACTURING OF DECORATIVE PANELS BY INKJET

CROSS REFERENCE TO RELATED APPLICATIONS

This application is a 371 National Stage Application of PCT/EP2016/060511, filed May 11, 2016. This application claims the benefit of European Application No. 15168913.0, filed May 22, 2015, which is incorporated by reference herein in its entirety.

BACKGROUND OF THE INVENTION

1. Field of the Invention

The present invention relates to the manufacturing of decorative panels using inkjet technology.

2. Description of the Related Art

Gravure, offset and flexography are being increasingly replaced for different applications by industrial inkjet printing systems, because of their flexibility in use, such as variable data printing making short production runs and personalized products possible at low cost, and their enhanced reliability, allowing incorporation into production lines.

EP 2865527 A (AGFA GRAPHICS) discloses a method of manufacturing a decorative surface including the steps of: a) impregnating a paper substrate with a thermosetting resin; b) jetting a colour pattern with one or more aqueous inkjet inks including a polymer latex binder on the thermosetting resin impregnated paper; c) drying the one or more aqueous inkjet inks; and d) heat pressing the thermosetting paper carrying the colour pattern into a decorative surface.

A major drawback of these wood- and paper-based decorative panels is their limited water resistance, which prevents their use in bathrooms and kitchens.

One approach is to use a water-resistant broadloom decorative surface, for example by applying wall-to-wall a PVC flooring roll. However, as the walls and entrances of rooms generally have multiple corners and indentations, the application of such a large flooring roll requires experienced workers and removal of all furniture from the room.

Another approach is to resolve the water resistance issue by replacing wood- and paper-based layers in decorative panels by water resistant polymeric layers. Such polymeric based floor panels employing polymers like polyvinyl chloride are disclosed by e.g. WO 2011/077311 A (FLOORING INDUSTRIES). These polymeric floor panels have interlock structures that interlock with similar panels having similar interlock structures allowing easy do-it-yourself mounting of a glue-free floor surface covering. The decorative layer in such floor panels is made by gravure printing water-based or solvent-based inks having a relatively high viscosity on a thermoplastic foil made of PVC.

Inkjet inks in general have a relatively low viscosity, which cause image quality problems, e.g. bleeding, when printing water-based or solvent-based inkjet inks on a thermoplastic foil made of PVC.

Hence, there is still a need for improved manufacturing methods of decorative surfaces using inkjet technology.

SUMMARY OF THE INVENTION

In order to overcome the problems described above, preferred embodiments of the present invention have been realised with a method for manufacturing polymeric decorative panels as defined below.

The use of specific aqueous pigmented inkjet inks allowed obtaining decorative panels with good adhesion without any need for any additional primer or adhesive layers and good image quality, and no cracking of the print during embossing.

The manufacturing process was made much simpler allowing it to be completely performed at the facilities of the decorative panel manufacturer.

One advantage was that the large stock of non-digitally printed decorative rolls could be eliminated as just-in-time inkjet printing was incorporated in the manufacturing process. Another advantage of this was that it became possible to react much faster to market trends and waste of decorative rolls was eliminated as they did not have to be ordered at a decor printer in a minimum purchasing quantity and way in advance.

In-house printing allows for a wide product variety and customized made products, e.g. decorative panels including company logo's, without substantial financial penalties.

Another advantage of inkjet printing is that the manufacturing process could be controlled to a level that, for example, an embossed wood grain is in perfect alignment with the inkjet printed wood colour pattern.

Further advantages and embodiments of the present invention will become apparent from the following description.

DETAILED DESCRIPTION OF THE PREFERRED EMBODIMENTS

Definitions

Figure 1:
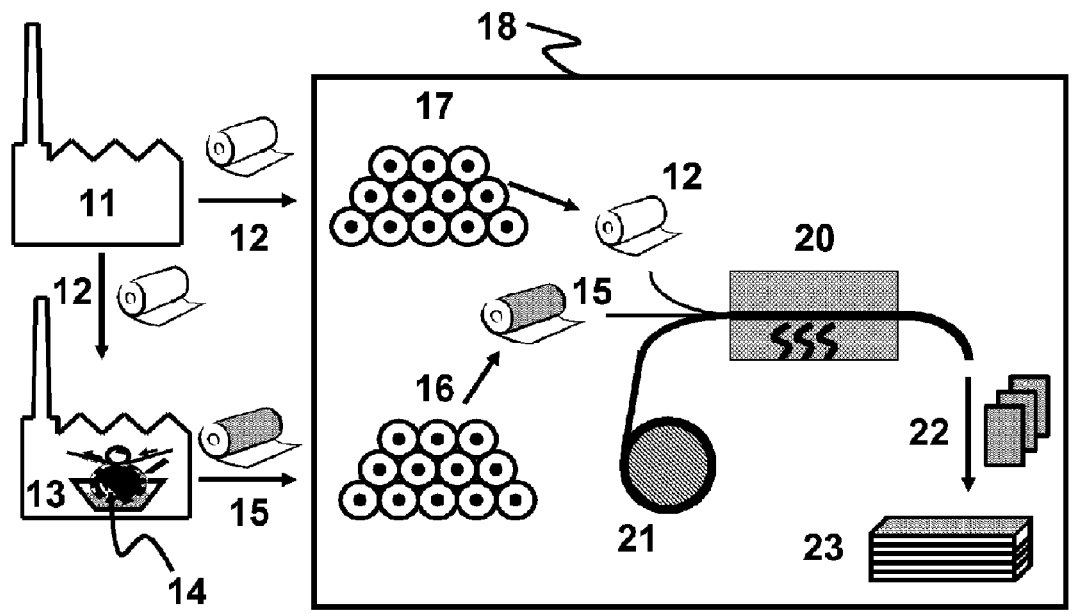
FIG. 1 shows the prior art production process for manufacturing polymeric decorative panels, wherein a PVC roll manufacturer (11) supplies a PVC roll (12) to a decor printer (13) using gravure printing (14) in order to deliver a decorative PVC roll (15) to a warehouse (16) of a floor panel manufacturer (18). The PVC roll manufacturer (11) supplies also PVC rolls (12) to a warehouse (17) of the floor panel manufacturer (18), who makes an assembly of layers from the PVC roll (12), the decorative PVC roll (15) and a base layer (21) which after heat-pressing (20) into a single unit are cut into decorative panels (22) that are collected in a decorative panel set (23) ready for sale.
Figure 2:
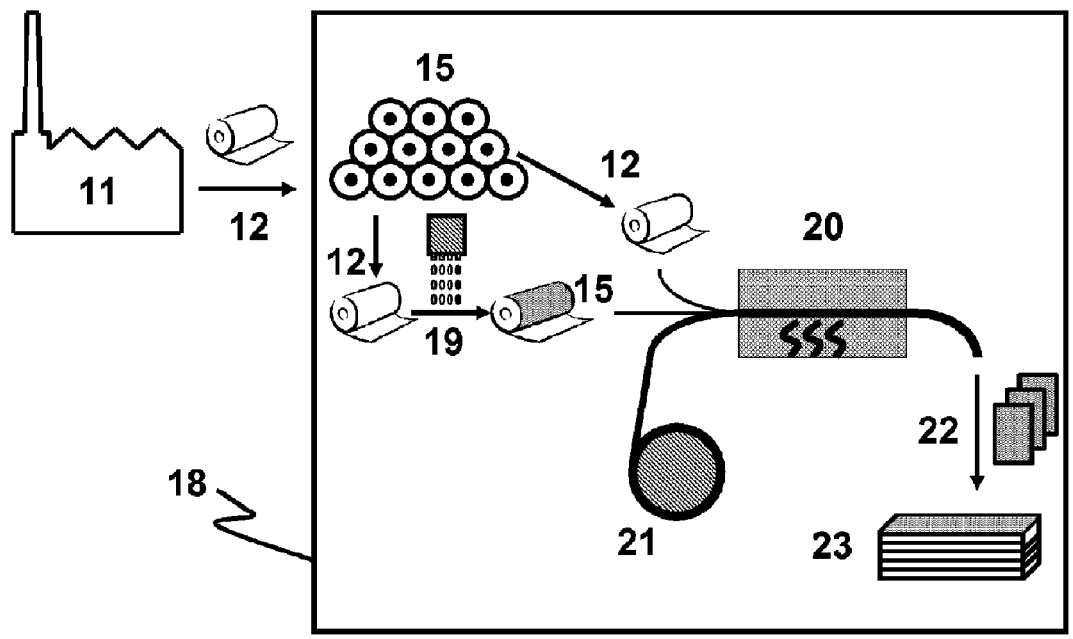
FIG. 2 shows a production process for manufacturing polymeric decorative panels, wherein a PVC roll manufacturer (11) supplies PVC rolls (12) to a warehouse (15) of a floor panel manufacturer (18), who prepares a decorative PVC roll (15) by inkjet printing (19) on a PVC roll (12). The floor panel manufacturer (18) then makes an assembly of layers from the PVC roll (12), the decorative PVC roll (15) and a base layer (21) which after heat-pressing (20) into a single unit are cut into decorative panels (22) that are collected in a decorative panel set (23) ready for sale.

The term "alkyl" means all variants possible for each number of carbon atoms in the alkyl group i.e. methyl, ethyl, for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethyl-propyl and 2-methyl-butyl, etc.

Unless otherwise specified a substituted or unsubstituted alkyl group is preferably a $C_1$ to $C_6$-alkyl group.

Unless otherwise specified a substituted or unsubstituted alkenyl group is preferably a $C_1$ to $C_6$-alkenyl group.

Unless otherwise specified a substituted or unsubstituted alkynyl group is preferably a $C_1$ to $C_6$-alkynyl group.

Unless otherwise specified a substituted or unsubstituted aralkyl group is preferably a phenyl or naphthyl group including one, two, three or more $C_1$ to $C_6$-alkyl groups.

Unless otherwise specified a substituted or unsubstituted alkaryl group is preferably a $C_7$ to $C_{20}$-alkyl group including a phenyl group or naphthyl group.

Unless otherwise specified a substituted or unsubstituted aryl group is preferably a phenyl group or naphthyl group Unless otherwise specified a substituted or unsubstituted heteroaryl group is preferably a five- or six-membered ring substituted by one, two or three oxygen atoms, nitrogen atoms, sulphur atoms, selenium atoms or combinations thereof.

The term "substituted", in e.g. substituted alkyl group means that the alkyl group may be substituted by other atoms than the atoms normally present in such a group, i.e. carbon and hydrogen. For example, a substituted alkyl group may include a halogen atom or a thiol group. An unsubstituted alkyl group contains only carbon and hydrogen atoms Unless otherwise specified a substituted alkyl group, a substituted alkenyl group, a substituted alkynyl group, a substituted aralkyl group, a substituted alkaryl group, a substituted aryl and a substituted heteroaryl group are preferably substituted by one or more constituents selected from the group consisting of methyl, ethyl, n-propyl, isopropyl, n-butyl, isobutyl and tertiary-butyl, ester, amide, ether, thio-ether, ketone, aldehyde, sulfoxide, sulfone, sulfonate ester, sulphonamide, —Cl, —Br, —I, —OH, —SH, —CN and —$NO_2$.

Manufacturing Methods of Decorative Panels

A method for manufacturing polymeric decorative panels according to a preferred embodiment of the present invention includes the steps of: a) inkjet printing (19) an image on a first thermoplastic foil (12) using an aqueous pigmented inkjet ink; b) applying a second thermoplastic foil (12) on the inkjet printed image; c) heat pressing (20) the first and second thermoplastic foils into a decorative laminate; and d) cutting the laminate into a decorative panel (22); wherein the aqueous pigmented inkjet ink contains polymeric resin particles and a self-dispersing colour pigment; and wherein at least one of the first and second thermoplastic foils is a transparent foil.

The foils are thermoplastic so that can be fused together during heat-pressing (20), which is preferably performed at a temperature above 130° C., more preferably between 140 and 170° C. The pressure is preferably more than 10 bar, more preferably between 15 and 40 bar.

The thermoplastic foils are preferably selected from the groups consisting of polyvinyl chloride (PVC), polyolefins like polyethylene (PE) and polypropylene (PP), polyamides (PA), polyurethane (PU), polystyrene (PS), acrylonitrile-butadiene-styrene (ABS), polymethyl methacrylate (PMMA), polycarbonate (PC), polyethylene terephthalate (PET), polyetheretherketone (PEEK) or mixtures or co-polymers of these.

In a preferred embodiment, the first and second thermoplastic foils are polyvinyl chloride foils. The polyvinylchloride foils are preferably of the rigid type including less than 10 wt % of plasticizer, more preferably these PVC foils contain 0 to 5 wt % of plasticizer. The plasticizer may be a phthalate plasticizer, but is preferably a non-phthalate plasticizer for health reasons.

Preferred non-phthalate plasticizers include diisononyl cyclohexane-1,2-dicarboxylate (DINCH), dipropylene glycol dibenzoate (DGD), diethylene glycol dibenzoate (DEGD), triethylene glycol dibenzoate (TEGD), acetylated monoglycerides of fully hydrogenated castor oil (COMGHA) isosorbide esters, bis-(2-ethylhexyl) terephthalate, vegetable oil based plasticizers like Ecolibrium™ from DOW, and blends thereof.

Decorative Panels

A decorative panel (22) obtained by the method according to a preferred embodiment of the present invention includes an inkjet printed image between two thermoplastic foils, wherein at least one of the two thermoplastic foils is a transparent foil.

In one embodiment, the decorative panel (22) includes an inkjet printed image on a first thermoplastic foil which forms the decorative layer (34) and a second transparent foil as the protective layer (33), and preferably also a base layer (35) for enhancing the rigidness of the panel. The first thermoplastic foil is preferably an opaque, more preferably a white opaque thermoplastic foil.

In an alternative embodiment, the image is inkjet printed on the transparent thermoplastic foil used as protective layer (33), the other thermoplastic foil, preferably opaque, is then fused to the side of the protective layer carrying the inkjet printed image, more preferably together with a base layer (35) for enhancing the rigidness of the panel. In the latter the transparent thermoplastic foil fulfils the role of both the decorative layer as well as the protective layer, and may be called a decorative protective layer.

The advantage of having an opaque thermoplastic foil in contact with the protective layer is that the colour vividness of the inkjet printed image is enhanced and that any irregularities influencing image quality in a base layer are masked. The opaque thermoplastic foil is preferably a white opaque thermoplastic foil, but may also be a yellowish or brownish opaque thermoplastic foil for reducing ink consumption during inkjet printing.

A major advantage of the present manufacturing methods is that no additional primer or adhesive layer on the second thermoplastic foil has to be applied for further enhancement of the adhesion between the thermoplastic foils. This simplifies the manufacturing process considerably as the primer usually has to be applied just before heat-pressing.

Nevertheless, if desired a primer may be applied. The primer is preferably selected from a polyurethane hot melt primer, a polyamide hot melt primer, a vinylchloride vinylacetate primer (VC-VAC) or a two component system of aliphatic isocyanates and a hydroxyl-, carboxy- or amine functionalized polyester or polyether.

In a more preferred embodiment, the decorative panel (22) includes a tongue (31) and groove (32) for glue-less interlocking with decorative panels having a similar tongue and groove. In a more preferred embodiment, the tongue (31) and groove (32) are part of the base layer (35).

Figure 3:
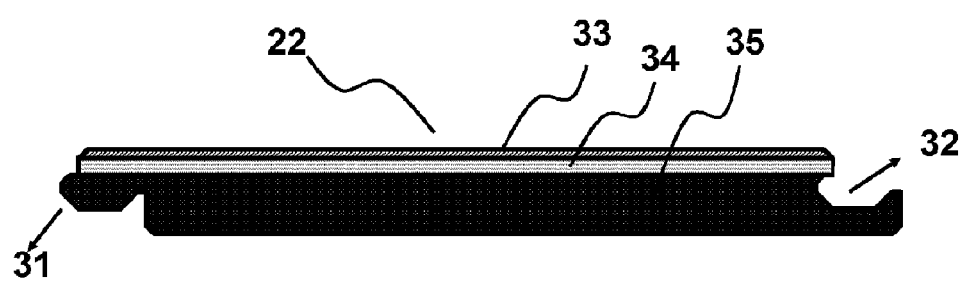
FIG. 3 shows a cross-section of a decorative panel (22) including a base layer (35) with a tongue (31) and groove (32) laminated on the top side by a decorative layer (34) and a protective layer (33).

Decorative panels including a tongue and a groove of a special shape (see FIG. 3) can be clicked into one another. The advantage thereof is a fast and easy assembly of a floor or wall requiring no glue. The shape of the tongue and groove necessary for obtaining a good mechanical join is well-known in the art of laminate flooring, as exemplified in EP 2280130 A (FLOORING IND), WO 2004/053258

(FLOORING IND), US 2008010937 (VALINGE) and U.S. Pat. No. 6,418,683 (PERSTORP FLOORING).

The tongue and groove profiles are especially preferred for flooring panels and wall panels, but in the case of furniture panels, such tongue and groove profile is preferably absent for aesthetical reasons of the furniture doors and drawer fronts. However, a tongue and groove profile may be used to click together the other panels of the furniture, as illustrated by US 2013071172 (UNILIN).

A decorative panel, like a floor panel, has one decorative layer. However, a decorative layer may be applied on both sides of a base layer. The latter is especially desirable in the case of decorative panels for furniture. In such a case, preferably also a protective layer is applied on both decorative layers present on both sides of the base layer.

The decorative panels may have any desired shape such as a square, a rectangle or an octagon. For flooring, the decorative panels preferably have a rectangular shape, for example, 18 cm×140 cm, and a thickness of 2 to 6 mm. At a thickness of no more than 6 mm, a large floor surface can be covered with a rather limited weight of decorative panels. The low weight increases comfort when installing the decorative panels and causes a financial benefit in transport to warehouses compared to heavier wood based decorative panels.

In a preferred embodiment, the decorative panels are made in the form of rectangular oblong strips. The dimensions thereof may vary greatly. Preferably the panels have a length exceeding 1 meter, and a width exceeding 0.1 meter, e.g. the panels can be about 1.3 meter long and about 0.15 meter wide. According to a special embodiment the length of the panels exceeds 2 meter, with the width being preferably about 0.2 meter or more. The print of such panels is preferably free from repetitions.

In a preferred embodiment the decorative panels are selected from the group consisting of kitchen panels, flooring panels, furniture panels, ceiling panels and wall panels.

The decorative panels may further include a sound-absorbing layer as disclosed by U.S. Pat. No. 8,196,366 (UNILIN).

Decorative Layers

The decorative layer includes a thermoplastic foil and an image, usually a colour pattern, printed thereon by inkjet.

There is no real restriction on the content of the colour pattern. The colour pattern may also contain information such as text, arrows, logo's and the like. The advantage of inkjet printing is that such information can be printed at low volume without extra cost, contrary to gravure printing.

In a preferred embodiment, the colour pattern is a wood reproduction or a stone reproduction, but it may also be a fantasy or creative pattern, such as an ancient world map or a geometrical pattern, or even a single colour for making, for example, a floor consisting of black and red tiles or a single colour furniture door.

An advantage of printing a wood colour pattern is that a floor can be manufactured imitating besides oak, pine and beech, also very expensive wood like black walnut which would normally not be available for house decoration.

An advantage of printing a stone colour pattern is that a floor can be manufactured which is an exact imitation of a stone floor, but without the cold feeling when walking barefooted on it and that it is easy replaceable over time according to fashion.

The thermoplastic foil used as decorative layer preferably has a thickness of at least 80 µm.

Protective Layers

The top surface of the decorative panel is usually the thermoplastic foil forming the protective layer. However, additional finishing layers may be applied upon the protective layer.

In a preferred embodiment, an antistatic layer is applied on the protective layer. Techniques to render decorative panels antistatic are well-known in the art of decorative laminates as exemplified by EP 1567334 A (FLOORING IND).

In a particular preferred embodiment, the decorative panel has a polyurethane finishing layer on the protective layer (33).

The top surface of the decorative panel, i.e. at least the protective layer, is preferably provided with a relief matching the colour pattern, such as for example the wood grain, cracks and knots in a woodprint. Embossing techniques to accomplish such relief are well-known in the art of flooring panels as disclosed by, for example, EP 1290290 A (FLOORING IND), US 2006144004 (UNILIN), EP 1711353 A (FLOORING IND) and US 2010192793 (FLOORING IND).

Most preferably the relief is formed by pressing a digital embossing plate against the thermoplastic foil forming the protective layer during heat-pressing.

A digital embossing plate is a plate which comprises elevations that can be used to form a relief on decorative panel by pressing the digital embossing plate against the protective layer of the decorative panel or nested decorative panels. The elevations are cured inkjet droplets, jetted by an inkjet print device, and most preferably UV cured inkjet droplets. The elevations are preferably formed by printing and curing inkjet droplets on top of already cured or pin-cured inkjet droplets. The plate is preferably stiff by using metal or hard plastic.

An alternative of a digital embossing plate may be a digital embossing cylinder which is a cylinder that comprises the elevations to form a relief on decorative panels by pressing and rotating the digital embossing cylinder against the protective layer of the decorative panels.

The protective layer may include hard particles, like corundum, for preventing wear. The total quantity of hard particles is preferably between 1 $g/m^2$ and 100 $g/m^2$, preferably 2 $g/m^2$ to 50 $g/m^2$.

Preferred hard particles are ceramic or mineral particles chosen from the group of aluminium oxide, silicon carbide, silicon oxide, silicon nitride, tungsten carbide, boron carbide, and titanium dioxide, or from any other metal oxide, metal carbide, metal nitride or metal carbonitride. The most preferred hard particles are corundum and so-called Sialon ceramics. In principle, a variety of particles may be used. Of course, also any mixture of the above-mentioned hard particles may be applied.

The amount of hard particles in may determined in function of the desired wear resistance, preferably by a so-called Taber test as defined in EN 13329 and also disclosed in WO 2013/050910 A (UNILIN) and U.S. Pat. No. 8,410,209 (CT FOR ABRASIVES AND REFRACTOR).

Hard particles having an average particle size of between 1 and 200 µm are preferred. Preferably an amount of such particles of between 1 and 40 $g/m^2$ is applied above the printed pattern. An amount lower than 20 $g/m^2$ can suffice for the lower qualities.

The thermoplastic foil used as protective layer preferably has a thickness of more than 100 µm, more preferably 300 to 700 µm.

Base Layers

In a preferred embodiment, the decorative panel (22) includes a base layer (21, 35). The base layer provides sufficient rigidness to the decorative panel, so that when e.g. a long rectangular decorative panel bends under its own weight, the panel does not break. For this reason, the base layer is preferably reinforced with fibres.

In a preferred embodiment, the base layer (21, 35) includes substantially polyvinyl chloride and reinforcing fibres. More preferably, the base layer includes substantially polyvinyl chloride and glass fibres.

The base layer may be composed of two PVC foils interposed by a glass fibre fleece.

The base layer may contain mineral. Particularly suitable herein are as talc or calcium carbonate (chalk), aluminum oxide, silica. The base layer may include a flame retardant.

Aqueous Pigmented Inkjet Inks

The aqueous pigmented inkjet inks used in the manufacturing process of the decorative panels contains polymeric resin particles and a self-dispersing colour pigment. It was found that inferior adhesion was obtained when the colour pigment was not self-dispersing but dispersed using a polymeric dispersant.

A self-dispersible or self-dispersing colour pigment requires no dispersant, because the pigment surface has ionic groups which realize electrostatic stabilization of the pigment dispersion. The preparation of self-dispersible colour pigments is well-known in the art, as exemplified by EP 904327 A (CABOT).

The polymeric resin particles are in the art often referred to as latex particles. Preferred polymeric resin particles are polyurethane based resin particles and (meth)acrylate based resin particles or mixtures thereof. In general, it was observed that polyurethane based resin particles delivered better adhesion results than (meth)acrylate based resin particles. Hence, polyurethane based resin particles as the polymeric resin particles in the aqueous pigmented inkjet inks used in the manufacturing process of the decorative panels are particularly preferred.

The aqueous inkjet ink contains preferably at least 2 wt %, more preferably at least 4 wt % of polymeric resin particles expressed as solids and based on the total weight of the aqueous pigmented inkjet ink. Aqueous inkjet ink containing 2 wt % or less of polymeric resin particles tend to show more bleeding.

The image, usually a colour pattern, is inkjet printed using one or more aqueous pigmented inkjet inks. The inkjet inks are composed into an inkjet ink set having differently coloured inkjet inks. The inkjet ink set may be a standard CMYK ink set, but is preferably a CRYK ink set wherein the magenta (M) ink is replaced by red (R) inkjet ink. The use of a red inkjet ink enhances the colour gamut for wood based colour patterns, which represent the majority of decorative panels in flooring.

A preferred aqueous pigmented inkjet ink set for manufacturing decorative surfaces includes or consists of a) a cyan aqueous inkjet ink containing a copper phthalocyanine pigment; b) a red aqueous inkjet ink containing a colour pigment selected from the group consisting of C.I Pigment Red 254, C.I. Pigment Red 122, and mixed crystals thereof; c) a yellow aqueous inkjet ink containing a colour pigment selected from the group consisting of C.I Pigment Yellow 151, C.I. Pigment Yellow 74, and mixed crystals thereof; and d) a black aqueous inkjet ink containing carbon black pigment, wherein the aqueous pigmented inkjet inks all include polymeric resin particles, preferably polyurethane based resin particles and wherein the colour pigments are self-dispersible.

The inkjet ink set may be extended with extra inks such as brown, red, green, blue, and/or orange to further enlarge the colour gamut of the ink set. The inkjet ink set may also be extended by the combination of the full density inkjet inks with light density inkjet inks. The combination of dark and light colour inks and/or black and grey inks improves the image quality by a lowered graininess. However preferably the inkjet ink set consists of no more than 3 or 4 inkjet inks, allowing the design of single pass inkjet printers of high throughput at acceptable cost.

The aqueous pigmented inkjet inks preferably have a surface tension of preferably between 18.0 and 45.0 mN/m at 25° C. An aqueous inkjet ink with a surface tension smaller than 18.0 mN/m at 25° C. usually has to include a high amount of surfactant, which may cause problems of foaming. A surface tension greater than 45.0 mN/m at 25° C. often leads to insufficient spreading of the ink on the thermoplastic foil.

Colorants

The colorant in the one or more aqueous inkjet inks is a colour pigment, as dyes where found to be unacceptable for light fastness in the application of decorative panels.

The colour pigments may be black, cyan, magenta, yellow, red, orange, violet, blue, green, brown, mixtures thereof, and the like. On the condition that the colour pigment is made self-dispersible, any colour pigment may be chosen from those disclosed by HERBST, Willy, et al. Industrial Organic Pigments, Production, Properties, Applications. 3rd edition. Wiley-VCH, 2004. ISBN 3527305769.

A particularly preferred self-dispersible colour pigment for a cyan aqueous inkjet ink is a β-copper phthalocyanine pigment, more preferably C.I. Pigment Blue 15:3 or C.I. Pigment Blue 15:4.

Particularly preferred self-dispersible colour pigments for a red aqueous inkjet ink are C.I Pigment Red 254 and C.I. Pigment Red 122, and mixed crystals thereof.

Particularly preferred self-dispersible colour pigments for yellow aqueous inkjet ink are C.I Pigment Yellow 151, C.I Pigment Yellow 155 and C.I. Pigment Yellow 74, and mixed crystals thereof.

For the black ink, the self-dispersible colour pigment is preferably a carbon black pigment.

Also mixed crystals may be used. Mixed crystals are also referred to as solid solutions. For example, under certain conditions different quinacridones mix with each other to form solid solutions, which are quite different from both physical mixtures of the compounds and from the compounds themselves. In a solid solution, the molecules of the components enter into the same crystal lattice, usually, but not always, that of one of the components. The x-ray diffraction pattern of the resulting crystalline solid is characteristic of that solid and can be clearly differentiated from the pattern of a physical mixture of the same components in the same proportion. In such physical mixtures, the x-ray pattern of each of the components can be distinguished, and the disappearance of many of these lines is one of the criteria of the formation of solid solutions.

Also mixtures of pigments may be used. For example, the inkjet ink includes a carbon black pigment and at least one pigment selected from the group consisting of a blue pigment, a cyan pigment, magenta pigment and a red pigment. It was found that such a black inkjet ink allowed easier and better colour management for wood colours.

The pigment particles in the pigmented inkjet ink should be sufficiently small to permit free flow of the ink through the inkjet printing device, especially at the ejecting nozzles. It is also desirable to use small particles for maximum colour strength and to slow down sedimentation.

The average particle size of the pigment in the aqueous pigmented inkjet ink should be between 0.005 µm and 15 µm. Preferably the average pigment particle size is between 0.005 and 5 µm, more preferably between 0.005 and 1 µm, particularly preferably between 0.005 and 0.3 µm and most preferably between 0.040 and 0.150 µm.

The pigment is used in the pigmented inkjet ink in an amount of 0.1 to 20 wt %, preferably 1 to 10 wt %, and most preferably 2 to 5 wt % based on the total weight of the pigmented inkjet ink. A pigment concentration of at least 2 wt % is preferred to reduce the amount of inkjet ink needed to produce the colour pattern, while a pigment concentration higher than 5 wt % reduces the colour gamut for printing the colour pattern with print heads having a nozzle diameter of 20 to 50 µm.

A white inkjet ink preferably includes a pigment with a high refractive index, preferably a refractive index greater than 1.60, preferably greater than 2.00, more preferably greater than 2.50 and most preferably greater than 2.60. Such white pigments generally have a very covering power, i.e. a limited amount of white ink is necessary to hide the colour and defects of the core layer. The most preferred white pigment is titanium dioxide.

The white inkjet ink preferably contains the white pigment in an amount of 5 wt % to 30 wt %, more preferably 8 to 25 wt % of white pigment based upon the total weight of the white inkjet ink.

The numeric average particle diameter of the white pigment is preferably from 50 to 500 nm, more preferably from 150 to 400 nm, and most preferably from 200 to 350 nm. Sufficient hiding power cannot be obtained when the average diameter is less than 50 nm, and the storage ability and the jet-out suitability of the ink tend to be degraded when the average diameter exceeds 500 nm.

Polymeric Resin Particles

The polymer resin particles are polymers, which may be cross-linked, that are water-insoluble. They are dispersed in the aqueous medium and as such often called a latex.

The polymer resin particles are preferably substantially made of polyurethane or poly(meth)acrylate, more preferably polyurethane. Hence, when referring to polyurethane based resin particles, this could mean that the polymer resin particles consist of a polyurethane-polyester polymer. The term "polyurethane based" means that the majority of the polymer in the polymer resin particles consists of polyurethane. Preferably at least 50 wt %, more preferably at least 70 wt % of the polymer in the polyurethane based resin particles consists of polyurethane. A very high amount of polyurethane assures for the good adhesion of the inkjet printed image to the thermoplastic foils.

The polymer resin particles are preferably self-dispersible polymer resin particles. A self-dispersing polymeric resin particle means that it does not require a free emulsifier and that can get into a dispersed state in an aqueous medium even in the absence of other surfactants due to a functional group (particularly, an acidic group or a salt thereof) that the polymer itself has.

The polymer resin particles are preferably self-dispersible polymer resin particles containing ionic dispersing groups, preferably selected from the group consisting of a carboxylic acid or salt thereof, a sulfonic acid or salt thereof, a phosphoric acid ester or salt thereof, a phosphonic acid or salt thereof, an ammonium group, a sulfonium group, and a phosphonium group.

In preparing self-dispersing polymer resin particles, preferably a monomer is used selected from the group consisting of a carboxylic acid monomer, a sulfonic acid monomer, and a phosphoric acid monomer.

The self-dispersing polymeric resin particles preferably have a carboxyl group, from the viewpoint of ejecting stability and stability of the liquid (particularly, dispersion stability) when using a colour pigment.

Alternatively the self-dispersing polymer resin particles include polyethylene oxide groups.

In a preferred embodiment, the one or more aqueous inkjet inks include inter-crosslinkable latex particles. Suitable examples are disclosed by EP 2467434 A (HP), however preferably the inter-crosslinking is obtained using (meth)acrylate groups. In the latter preferably one or more photoinitiators and optionally co-initiators are present. This allows for pincuring by UV exposure the inkjet printed latex which results in a higher image quality.

Monomers that can be included in the polymeric resin particles include, without limitation, styrene, p-methyl styrene, methyl methacrylate, hexyl acrylate, hexyl methacrylate, 2-ethylhexyl acrylate, 2-ethylhexyl methacrylate, butyl acrylate, butyl methacrylate, ethyl acrylate, ethyl methacrylate, propyl acrylate, propyl methacrylate, octadecyl acrylate, stearyl methacrylate, vinylbenzyl chloride, isobornyl acrylate, tetrahydrofurfuryl acrylate, 2-phenoxyethyl methacrylate, ethoxylated nonyl phenol methacrylate, isobornyl methacrylate, cyclohexyl methacrylate, t-butyl methacrylate, n-octyl methacrylate, lauryl methacrylate, tridecyl methacrylate, alkoxylated tetrahydrofurfuryl acrylate, isodecyl acrylate, isobornylmethacrylate, derivatives thereof, and mixtures thereof.

The polymerized monomers of the polymeric resin particles preferably include a crosslinker that crosslinks the polymerized monomers and enhances the latency in inkjet printing of the polymeric resin particles. Suitable crosslinking monomers are polyfunctional monomers and oligomers such as, without limitation, ethylene glycol dimethacrylate, diethylene glycol dimethacrylate, ethylene glycol diacrylate, diethylene glycol diacrylate, 1,6-hexanediol diacrylate, tetraethylene glycol diacrylate, tripropylene glycol diacrylate, ethoxylated bisphenol A diacrylate, pentaerythritol tri- and tetraacrylate, N,N'-methylenebisacrylamide, divinylbenzene and combinations thereof, mixtures thereof, and derivatives thereof. When present, the cross-linkers preferably comprise from 0.1 wt % to 15 wt % of the polymerized monomers.

Specific examples of the unsaturated carboxylic acid monomer for the self-dispersible polymeric resin particles include acrylic acid, methacrylic acid, crotonic acid, itaconic acid, maleic acid, fumaric acid, citraconic acid, and 2-methacryloyloxy methylsuccinic acid. Specific examples of the unsaturated sulfonic acid monomer include styrene sulfonic acid, 2-acrylamido-2-methyl propane sulfonic acid, 3-sulfopropyl (meth)acrylate, and bis-(3-sulfopropyl)-itaconate. Specific examples of the unsaturated phosphoric acid monomer include vinyl phosphoric acid, vinyl phosphate, bis (methacryloxyethyl)phosphate, diphenyl-2-acryloyloxyethyl phosphate, diphenyl-2-methacryloyloxyethyl phosphate, and dibutyl-2-acryloyloxyethyl phosphate.

The polymeric resin particles preferably have a glass transition temperature (Tg) of no more than 70° C., more preferably no more than 50° C.

The minimum film-forming temperature (MFT) of the polymer latex is preferably between −50 and 70° C., more preferably between −40 and 50° C.

The average particle size of the polymeric resin particles in the inkjet ink is preferably less than 300 nm, more preferably less than 200 nm as measured by laser diffraction, e.g. using a Beckman Coulter™ LS 13320.

Biocides

Suitable biocides for the aqueous pigmented inkjet inks include sodium dehydroacetate, 2-phenoxyethanol, sodium benzoate, sodium pyridinethion-1-oxide, ethyl p-hydroxybenzoate and 1,2-benzisothiazolin-3-one and salts thereof.

Preferred biocides are Proxel™ GXL and Proxel™ Ultra 5 available from ARCH UK BIOCIDES and Bronidox™ available from COGNIS.

A biocide is preferably added in an amount of 0.001 to 3.0 wt. %, more preferably 0.01 to 1.0 wt. %, each based on the total weight of the pigmented inkjet ink.

Humectants

Suitable humectants include triacetin, N-methyl-2-pyrrolidone, 2-pyrrolidone, glycerol, urea, thiourea, ethylene urea, alkyl urea, alkyl thiourea, dialkyl urea and dialkyl thiourea, diols, including ethanediols, propanediols, propanetriols, butanediols, pentanediols, and hexanediols; glycols, including propylene glycol, polypropylene glycol, ethylene glycol, polyethylene glycol, diethylene glycol, tetraethylene glycol, and mixtures and derivatives thereof. Preferred humectants are 2-pyrrolidone, glycerol and 1,2-hexanediol, since the latter were found to be the most effective for improving inkjet printing reliability in an industrial environment.

The humectant is preferably added to the inkjet ink formulation in an amount of 0.1 to 35 wt % of the formulation, more preferably 1 to 30 wt % of the formulation, and most preferably 3 to 25 wt % of the formulation.

pH Adjusters

The aqueous inkjet inks may contain at least one pH adjuster. Suitable pH adjusters include NaOH, KOH, NEt$_3$, NH$_3$, HCl, HNO$_3$, H$_2$SO$_4$ and (poly)alkanolamines such as triethanolamine and 2-amino-2-methyl-1-propaniol. Preferred pH adjusters are triethanol amine, NaOH and H$_2$SO$_4$.

Surfactants

The one or more aqueous pigmented inkjet inks may contain at least one surfactant. The surfactant(s) can be anionic, cationic, non-ionic, or zwitter-ionic and are usually added in a total quantity less than 5 wt % based on the total weight of the inkjet ink and particularly in a total less than 2 wt % based on the total weight of the inkjet ink.

The one or more aqueous pigmented inkjet inks preferably have a surface tension between 18.0 and 45.0 mN/m at 25° C., more preferably between a surface tension between 21.0 and 39.0 mN/m at 25° C.

Suitable surfactants for the aqueous inkjet inks include fatty acid salts, ester salts of a higher alcohol, alkylbenzene sulphonate salts, sulphosuccinate ester salts and phosphate ester salts of a higher alcohol (for example, sodium dodecylbenzenesulphonate and sodium dioctylsulphosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and SURFYNOL™ 104, 104H, 440, 465 and TG available from AIR PRODUCTS & CHEMICALS INC.).

Preferred surfactants are selected from fluoro surfactants (such as fluorinated hydrocarbons) and/or silicone surfactants.

The silicone surfactants are preferably siloxanes and can be alkoxylated, polyester modified, polyether modified, polyether modified hydroxy functional, amine modified, epoxy modified and other modifications or combinations thereof. Preferred siloxanes are polymeric, for example polydimethylsiloxanes. Preferred commercial silicone surfactants include BYK™ 333 and BYK™ UV3510 from BYK Chemie.

Particularly preferred commercial fluorosurfactants are Capstone™ FS3100 from DU PONT, Tivida™ FL2500 from MERCK and Thetawet™ FS8150 from NEOCHEM GMBH.

Inkjet Printing Devices

The aqueous pigmented inkjet inks may be jetted by one or more print heads ejecting small droplets of ink in a controlled manner through nozzles onto an ink-receiver surface, which is moving relative to the print head(s).

A preferred print head for the inkjet printing system is a piezoelectric head. Piezoelectric inkjet printing is based on the movement of a piezoelectric ceramic transducer when a voltage is applied thereto. The application of a voltage changes the shape of the piezoelectric ceramic transducer in the print head creating a void, which is then filled with ink. When the voltage is again removed, the ceramic expands to its original shape, ejecting a drop of ink from the print head. However the inkjet printing method according to the present invention is not restricted to piezoelectric inkjet printing. Other inkjet print heads can be used and include various types, such as a continuous type and thermal, electrostatic and acoustic drop on demand type.

The inkjet print head normally scans back and forth in a transversal direction across the moving ink-receiver surface. Often the inkjet print head does not print on the way back. Bi-directional printing is preferred for obtaining a high areal throughput. Another preferred printing method is by a "single pass printing process", which can be performed by using page wide inkjet print heads or multiple staggered inkjet print heads which cover the entire width of the ink-receiver surface. In a single pass printing process the inkjet print heads usually remain stationary and the substrate surface is transported under the inkjet print heads.

Thermal Curing Devices

The inkjet printer contains a thermal curing device for removing water and organic solvents in the inkjet printed image.

The thermal curing device may include a dryer. Suitable dryers include devices circulating hot air, ovens, and devices using air suction.

A pre-heating device may be included in the inkjet printing device for heating the substrate prior to jetting. The pre-heating device may be an infrared radiation source as described here below, or may be a heat conduction device, such as a hot plate or a heat drum. A preferred heat drum is an induction heat drum.

A preferred thermal curing device uses Carbon Infrared Radiation (CIR) to heat the outside of the substrate quickly. Another preferred thermal curing device is a NIR source emitting near infrared radiation. NIR-radiation energy quickly enters into the depth of the inkjet ink layer and removes water and solvents out of the whole layer thickness, while conventional infrared and thermo-air energy predominantly is absorbed at the surface and slowly conducted into the ink layer, which results usually in a slower removal of water and solvents.

The thermal curing device may be, at least in part, arranged in combination with the print head of the inkjet printer, travelling therewith so that the curing radiation is applied very shortly after jetting. In such a case, the inkjet printer is preferably equipped with some kind of infrared radiation source, e.g. an infrared light source, such as an infrared laser, one or more infrared laser diodes or infrared LEDs.

A preferred effective infrared radiation source has an emission maximum between 0.8 and 1.5 μm. Such an infrared radiation source is sometimes called a NIR radiation source or NIR dryer. In a preferred form the NIR radiation source is in the form of NIR LEDs, which can be mounted easily on a shuttling system of a plurality of inkjet print heads in a multi-pass inkjet printing device.

EXAMPLES

Materials

All materials used in the following examples were readily available from standard sources such as Aldrich Chemical Co. (Belgium) and Acros (Belgium) unless otherwise specified. The water used in the examples is demineralized water.

PU-1 is a 40% dispersion of polyester type polyurethane resin particles available as Vondic™ 2220 from DIC Corporation.

PU-2 is a dispersion of polyurethane based resin particles available as Emuldur™ 381A from BASF.

PMMA is a polymethylmethacrylate dispersion available as PLM167 from Agfa-Gevaert NV.

PY151 is a C.I. Pigment yellow 151 pigment available as Inkjet Yellow™ H4G LV 3853 from CLARIANT.

Edaplan is an abbreviation used for Edaplan™ 482, a polymeric dispersant from MUNZING.

Proxel is an abbreviation used for the biocide Proxel™ K from AVECIA.

Yel-1 is a concentrated aqueous pigment dispersion made by mixing a composition according to Table 1 for 30 minutes using a Disperlux™ mixer and then milling it with a LMZ10 mill from NETZSCH with 0.04 mm yttrium stabilized zirconium beads YTZ™ Grinding Media (available from TOSOH Corp.). The mill was filled to half its volume with the grinding beads and the dispersion was milled for 2.5 hours at a rotation speed of 15 m/s. After milling, the dispersion is separated from the beads.

TABLE 1

| Component | Concentration (wt %) |
| --- | --- |
| PY151 | 15.00 |
| Edaplan | 15.00 |
| Proxel | 0.02 |
| Water | to complete 100.00 wt % |

Yel-2 is pigment dispersion based of C.I. Pigment Yellow 74 stabilized by a polymeric dispersant available as Diamond™ D75Y from DIAMOND DISPERSIONS.

Yel-3 is a self-dispersible pigment dispersion based on C.I. Pigment Yellow 155 available as Cab-o-Jet™ 470Y from CABOT.

PIG-C is a self-dispersible pigment dispersion based on a β-copper phthalocyanine pigment available as Cab-o-Jet™ 250C from CABOT.

PIG-R is a self-dispersible pigment dispersion based on C.I. Pigment Red 122 available as Cab-o-Jet™ 465M from CABOT.

PIG-K is a self-dispersible pigment dispersion based on carbon black available as Cab-o-Jet™ 300 from CABOT.

PYR is 2-pyrrolidone.

HD is 1,2-hexanediol.

SURF is a fluorosurfactant Thetawet™ FS8150 available from NEOCHEM GMBH.

P1BT is a 100 μm thick opaque white polyvinyl chloride foil.

C3 is a 500 μm thick transparent polyvinyl chloride foil.

Measurement Methods

1. Viscosity

The viscosity was measured at 25° C. and at a shear rate of 1,000 s$^{-1}$ using a Rotovisco™ RV1 viscometer from HAAKE.

2. Surface Tension

The static surface tension of the UV curable inks was measured with a KRÜSS tensiometer K9 from KRÜSS GmbH, Germany at 25° C. after 60 seconds.

3. Adhesion

A cutter is used to cut through the thermoplastic foils and the adhesion of the different layers to each other is evaluated.

TABLE 2

| Criterium | Evaluation |
| --- | --- |
| Very good | No delamination |
| Good | Slight delamination |
| Bad | Strong delamination |

Example 1

This example illustrates the effect of the type of colour pigment dispersion on the adhesion after heat-pressing into a decorative panel using polyvinyl chloride foils.

Preparation of Inkjet Inks

The inkjet inks COMP-1 to COMP-5 and INV-1 to INV-3 were prepared by mixing the components according to Table 3. The wt % is based on the total weight of the inkjet ink.

TABLE 3

| wt % of | COMP-1 | COMP-2 | COMP-3 | COMP-4 | COMP-5 | INV-1 | INV-2 | INV-3 |
| --- | --- | --- | --- | --- | --- | --- | --- | --- |
| PU-1 | 20.0 | 20.0 | — | — | — | 20.0 | — | — |
| PU-2 | — | — | 20.0 | — | — | — | 20.0 | — |
| PMMA | — | — | — | 38.0 | 38.0 | — | — | 38.0 |
| Yel-1 | 20.0 | — | 20.0 | 20.0 | — | — | — | — |
| Yel-2 | — | 20.0 | — | — | 20.0 | — | — | — |
| Yel-3 | — | — | — | — | — | 20.0 | 20.0 | 20.0 |
| SURF | 0.8 | 0.8 | 0.8 | 0.8 | 0.8 | 0.8 | 0.8 | 0.8 |
| PYR | 20.0 | 20.0 | 20.0 | 20.0 | 20.0 | 20.0 | 20.0 | 20.0 |
| HD | 20.0 | 20.0 | 20.0 | 20.0 | 20.0 | 20.0 | 20.0 | 20.0 |
| Water | 19.2 | 19.2 | 19.2 | 1.2 | 1.2 | 19.2 | 19.2 | 1.2 |

Manufacturing of Decorative Panel

The inkjet inks COMP-1 to COMP-5 and INV-1 to INV-3 were coated at a wet thickness of 4 μm on the matt side of the thermoplastic foil P1BT using a bar coater and wired bar. The coated samples were dried at 60° C.

The coated thermoplastic foils P1BT were each combined with a transparent thermoplastic foil C3, by having the ink mixture layer on the foil P1BT facing the primer layer of the foil C3. Together with a 4 mm thick PVC foil containing glass fibres as a base layer the foils P1BT and C3 were heat pressed for 1 minute using an embossing plate at a temperature of 200° C. and a pressure of 12 bar and then cut into a decorative panel.

Evaluation and Results

The heat-pressed samples were evaluated for adhesion. The results are shown in Table 4.

TABLE 4

| Decorative Panel | Adhesion |
| --- | --- |
| COMP-1 | Bad |
| COMP-2 | Bad |
| COMP-3 | Bad |
| COMP-4 | Bad |
| COMP-5 | Bad |
| INV-1 | Good |
| INV-2 | Very Good |
| INV-3 | Good |

From Table 4, it can be seen that only the inkjet inks INV-1 to INV-3 using self-dispersible yellow pigments exhibited good adhesion results for the decorative panels, while the other inkjet inks using pigments dispersed with a polymeric dispersant or surfactant were incapable of delivering a good adhesion. It should be noted that no additional primer was present on the thermoplastic foil.

Example 2

This example illustrates a CRYK inkjet ink set and inkjet printing therewith for a decorative panel.

Preparation of Inkjet Inks

The inkjet inks INK-C, INK-R and Ink-K were prepared by mixing the components according to Table 5. The wt % is based on the total weight of the inkjet ink.

TABLE 5

| wt % of | Ink-C | Ink-R | Ink-K |
| --- | --- | --- | --- |
| PU-1 | 20.0 | 20.0 | 20.0 |
| PIG-C | 30.0 | — | — |
| PIG-R | — | 20.0 | — |
| PIG-K | — | — | 20.0 |
| SURF | 0.8 | 0.8 | 0.8 |
| PYR | 20.0 | 20.0 | 20.0 |
| HD | 20.0 | 20.0 | 20.0 |
| Water | 9.2 | 19.2 | 19.2 |

The yellow inkjet ink INV-1 of Example 1 was used to complete the CRYK inkjet ink set. All the inkjet inks had a viscosity between 6 and 8 mPa·s and a surface tension between 27 and 28 mN/m.

Manufacturing of Decorative Panel

Figure 4:
FIG. 4 shows a photograph of a decorative panel having an inkjet printed image between two heat-pressed thermoplastic foils. The inkjet image includes text, lines, a logo and a large full coloured square.

An image as in FIG. 4 was printed with each inkjet ink on the transparent thermoplastic foil C3 using a Dimatix™ DMP2831 system, equipped with a standard Dimatix™ 10 pl print head. The ink was jetted at 22° C., using a firing frequency of 5 kHz, a firing voltage of 20 V-25 V, a standard waveform and a standard cartridge setting. All inkjet inks proved to have an excellent jettability. The inkjet inks were dried at 80° C.

The printed thermoplastic foils C3 were each combined with an opaque thermoplastic foil P2. Together with a 4 mm thick PVC foil containing glass fibres as a base layer, the foils P2 and C3 were heat pressed for 1 minute using an embossing plate at a temperature of 200° C. and a pressure of 12 bar and then cut into a decorative panel.

Evaluation and Results

The heat-pressed samples were evaluated for adhesion. The results are shown in Table 6.

TABLE 6

| Printed sample | Adhesion |
| --- | --- |
| INV-1 | good |
| Ink-C | good |
| Ink-R | good |
| Ink-K | very good |

As can be seen in Table 6, al the decorative panels exhibited good adhesion results.

REFERENCE SIGNS LIST

TABLE 7

| 11 | PVC roll manufacturer |
| --- | --- |
| 12 | PVC roll |
| 13 | Decor printer |
| 14 | Gravure printing |
| 15 | Decorative PVC roll |
| 16 | Warehouse PVC rolls |
| 17 | Warehouse decorative PVC rolls |
| 18 | Floor panel manufacturer |
| 19 | Inkjet printing |
| 20 | Heat pressing |
| 21 | Base layer |
| 22 | Decorative panel |
| 23 | Decorative panel set |
| 31 | Tongue |
| 32 | Groove |
| 33 | Protective layer |
| 34 | Decorative layer |
| 35 | Base layer |

The invention claimed is:

1. A method for manufacturing a polymeric decorative panel comprising, in order, the steps of:
   inkjet printing an image directly on a surface of a first thermoplastic foil using an aqueous pigmented inkjet ink to form an inkjet printed image;
   drying the inkjet printed image;
   applying a second thermoplastic foil on the inkjet printed image;
   heat pressing the first and second thermoplastic foils into a decorative laminate; and
   cutting the decorative laminate to form a decorative panel; wherein
   the aqueous pigmented inkjet ink includes polymeric resin particles and a self-dispersing color pigment, and the self-dispersing color pigment is C.I. Pigment Red 254 or a mixed crystal thereof;

at least one of the first and second thermoplastic foils is a transparent foil;

the step of heat pressing is performed at a temperature above 130° C. and a pressure of more than 10 bar; and the surface of the first thermoplastic foil consists of a polymer selected from the group consisting of polyvinyl chloride, polyolefin, polyamide, polyurethane, polystyrene, acrylonitrile-butadiene-styrene, polymethyl methacrylate, polycarbonate, polyethylene terephthalate, polyetheretherketone, and mixtures or co-polymers thereof.

2. The method according to claim 1, wherein the first and second thermoplastic foils include polyvinyl chloride.

3. The method according to claim 1, wherein the polymeric resin particles include polyurethane based latex particles.

4. The method according to claim 1, wherein the aqueous pigmented inkjet ink is printed on the transparent foil.

5. The method according to claim 1, wherein one of the first and second thermoplastic foils is an opaque foil, and the aqueous pigmented inkjet ink is printed on the opaque foil.

6. The method according to claim 1, wherein the first and second thermoplastic foils include an opaque foil and the transparent foil.

7. The method according to claim 1, wherein the decorative panel includes a base layer.

8. The method according to claim 7, wherein the base layer includes polyvinyl chloride and reinforcing fibers.

9. The method according to claim 8, wherein the reinforcing fibers include glass fibers.

10. The method according to claim 1, wherein the step of drying the inkjet printed image includes at least partially drying the aqueous pigmented inkjet ink using an infrared radiation source.

11. The method according to claim 1, wherein the step of inkjet printing is a single pass printing process in which inkjet print heads remain stationary while the first thermoplastic foil is transported under the inkjet print heads.

12. A decorative panel obtained by the method according to claim 1.

13. The decorative panel according to claim 12, wherein the decorative panel includes a glueless tongue and groove joint capable of interlocking other decorative panels.

14. The decorative panel according to claim 12, wherein the decorative panel has a thickness of 2 mm to 6 mm.

15. The decorative panel according to claim 12, wherein the decorative panel includes a base layer, a decorative layer, a protective layer, and a polyurethane finishing layer on the protective layer.

* * * * *